US012343989B2

(12) United States Patent
Nitta

(10) Patent No.: US 12,343,989 B2
(45) Date of Patent: Jul. 1, 2025

(54) LIQUID EJECTION HEAD

(71) Applicant: RISO Technologies Corporation, Tokyo (JP)

(72) Inventor: Noboru Nitta, Tagata Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 220 days.

(21) Appl. No.: 18/085,394

(22) Filed: Dec. 20, 2022

(65) Prior Publication Data

US 2023/0264470 A1 Aug. 24, 2023

(30) Foreign Application Priority Data

Feb. 21, 2022 (JP) ................................ 2022-024419

(51) Int. Cl.

*B41J 2/045* (2006.01)
*B41J 2/14* (2006.01)
*B41J 2/175* (2006.01)

(52) U.S. Cl.

CPC ............. *B41J 2/04541* (2013.01); *B41J 2/14* (2013.01); *B41J 2/175* (2013.01); *B41J 2002/14491* (2013.01)

(58) Field of Classification Search

CPC ....... B41J 2/14; B41J 2/045; B41J 2/16; B41J 2/175; B41J 2/145; B41J 2/04541; B41J 2/14072; H05K 1/18; H05K 1/14; H01L 23/538

See application file for complete search history.

(56) References Cited

U.S. PATENT DOCUMENTS

| | | | |
|---|---|---|---|
| 9,969,163 | B2 | 5/2018 | Muraoka |
| 10,611,148 | B2 | 4/2020 | Nitta |
| 10,618,281 | B2 | 4/2020 | Nitta |
| 10,814,616 | B2 | 10/2020 | Nitta |

(Continued)

FOREIGN PATENT DOCUMENTS

| | | | |
|---|---|---|---|
| JP | 2001179995 | A | 7/2001 |
| JP | 2008188888 | A | 8/2008 |
| JP | 2012139918 | A | 7/2012 |

OTHER PUBLICATIONS

U.S. Appl. No. 17/834,601, filed Jun. 7, 2022.
Extended European Search Report dated Jul. 11, 2023, mailed in counterpart European Application No. 23154780.3, 45 pages.

*Primary Examiner* — John Zimmermann
(74) *Attorney, Agent, or Firm* — Kim & Stewart LLP

(57) ABSTRACT

A liquid ejection head includes actuators spaced along a first direction between a first edge and a second edge of a substrate in a second direction. Individual wirings are connected to a first terminal of an actuator and has a terminal portion at the first edge of the substrate. A common wiring has a first portion and a plurality of second portions. Each second portion is branched from the first portion in the second direction and individually connects to a second terminal of an actuator. The first portion extends along the first direction on the substrate and has a first end terminal and a second end terminal spaced from each other. A monitor terminal is at a position between the first and second end terminals. The monitor terminal extends in the second direction from the first edge of the substrate toward the first portion to which it is electrically connected.

19 Claims, 6 Drawing Sheets

(56) References Cited

U.S. PATENT DOCUMENTS

| | | | | |
|---|---|---|---|---|
| 2001/0033304 | A1* | 10/2001 | Ishinaga | B41J 2/04563 347/12 |
| 2003/0156163 | A1* | 8/2003 | Watanabe | B41J 2/14233 347/68 |
| 2008/0100683 | A1* | 5/2008 | Komatsu | B41J 2/16532 347/92 |
| 2008/0186342 | A1* | 8/2008 | Ito | B41J 2/04541 347/9 |
| 2011/0032311 | A1* | 2/2011 | Miyazawa | B41J 2/1642 29/890.1 |
| 2013/0050338 | A1* | 2/2013 | Shimosato | B41J 2/14209 29/890.1 |
| 2017/0129239 | A1* | 5/2017 | Kubota | B41J 2/162 |
| 2017/0334204 | A1* | 11/2017 | Shimosato | B41J 2/1609 |
| 2019/0255847 | A1 | 8/2019 | Nitta | |
| 2020/0180311 | A1* | 6/2020 | Nakayama | B41J 2/1623 |

* cited by examiner

LIQUID EJECTION HEAD

CROSS-REFERENCE TO RELATED APPLICATION

This application is based upon and claims the benefit of priority from Japanese Patent Application No. 2022-024419, filed Feb. 21, 2022, the entire contents of which are incorporated herein by reference.

FIELD

Embodiments described herein relate generally to a liquid ejection head.

BACKGROUND

A liquid ejection head that supplies a predetermined amount of a liquid to a predetermined position is known. Such a liquid ejection head can be mounted in an inkjet printer, a 3D printer, a liquid dispensing device, or the like. An inkjet printer ejects ink droplets from an inkjet head to form an image on a surface of a recording medium. A 3D printer ejects droplets of a molding material from a molding material ejection head and the droplets are cured to form a three-dimensional molded object. A dispensing device ejects droplets of a sample liquid or solution to supply a predetermined amount of the sample liquid or solution to a plurality of different containers (e.g., wells of a well plate or the like).

A liquid ejection head typically includes a plurality of channels for ejecting liquid. Each channel includes a nozzle, a pressure chamber connected to the nozzle, and an actuator that changes a volume of the pressure chamber to eject liquid from the nozzle. The liquid ejection head selects a channel from among the available channels, and applies a drive signal to the actuator of the selected channel to drive the actuator. When the actuator is driven, the volume of the pressure chamber changes, and the liquid in the pressure chamber is ejected from the nozzle of the selected channel.

One terminal of the actuator is connected to an individual wiring that applies the drive voltage. The other terminal of the actuator is connected to a common wiring that applies a common potential to every actuator. It is desirable that the common potential be kept constant for every actuator. However, in reality, the applied common potential may not be constant across every actuator due to resistance in the common wiring. If the potential on the common wiring varies, ejection characteristics of the liquid may be adversely affected. Therefore, it can be necessary to measure the resistance of the common wiring so that the resistance of the common wiring can be kept to a low value.

DETAILED DESCRIPTION

Figure 1:
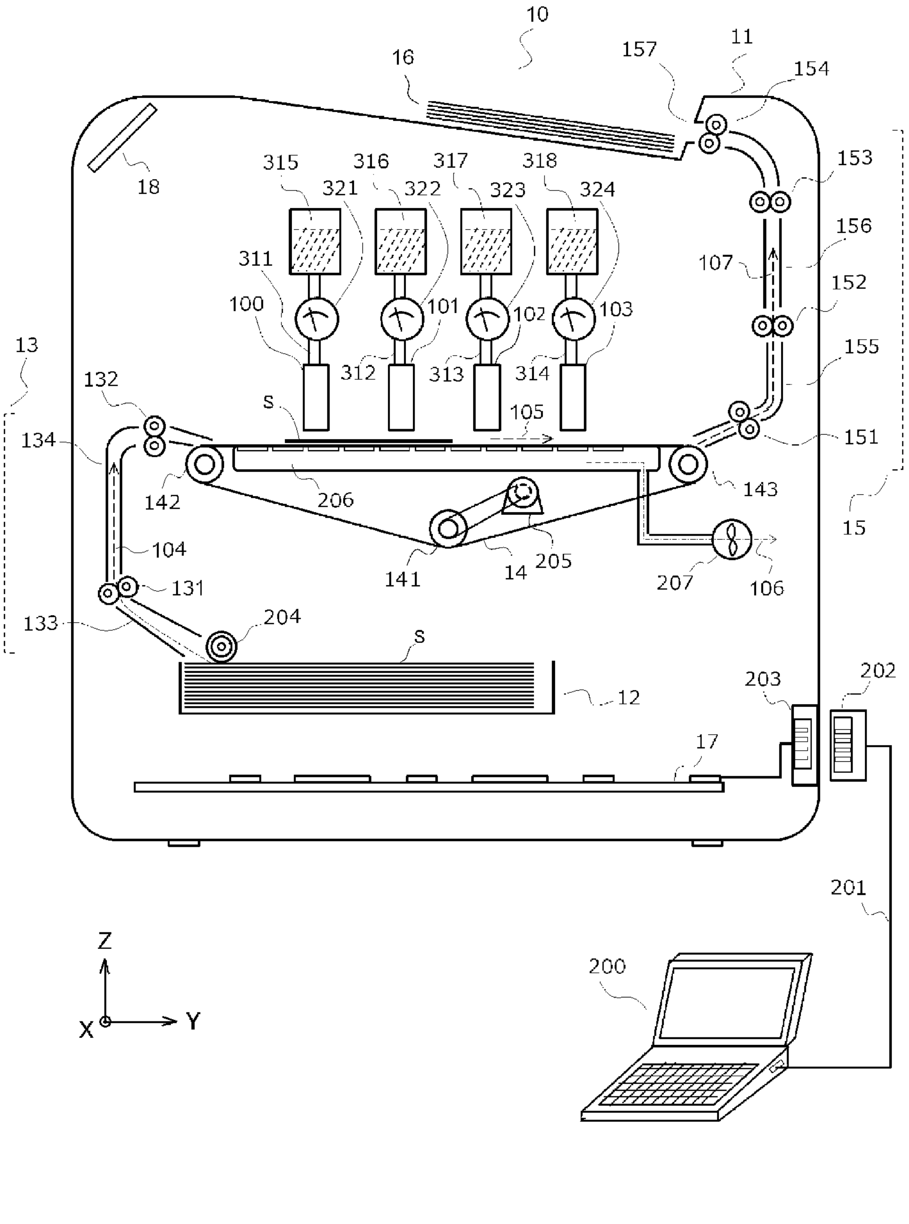
FIG. 1 is an overall configuration diagram of an inkjet printer including an inkjet head according to an embodiment.

In general, a liquid ejection head in which resistance of a common wiring used to apply a common potential to a plurality of actuators can be measured is described.

According to one embodiment, a liquid ejection head includes a plurality of actuators on a substrate spaced from one another along a first direction. The actuators are between a first edge side of the substrate and a second edge side of the substrate in a second direction. A plurality of individual wirings is provided. Each individual wiring is connected to a first terminal of an actuator in the plurality of actuators and has a terminal portion at the first edge side of the substrate. A common wiring is provided with a first portion and a plurality of second portions. Each second portion is branched from the first portion in the second direction and individually connected to a second terminal of an actuator in the plurality of actuators. The first portion extends along the first direction on the second edge side of the substrate and has a first end terminal and a second end terminal spaced from each other in the first direction. A monitor terminal is provided at a position between the first and second end terminals of the first portion in the first direction. The monitor terminal extends in the second direction from the first edge side of the substrate toward the first portion. The monitor terminal is electrically connected to the first portion.

Hereinafter, a liquid ejection head according to certain example embodiments will be described with reference to the accompanying drawings. In the drawings, the same elements, aspects, or components are denoted by the same reference symbols.

An inkjet printer 10 that can be equipped with a liquid ejection head according to an embodiment will be described as an example. FIG. 1 illustrates a schematic configuration of the inkjet printer 10. In the inkjet printer 10, a cassette 12 in which a sheet S can be stored, an upstream conveyance path 13 of the sheet S, a conveyance belt 14 that conveys the sheet S from the cassette 12, a plurality of inkjet heads (100, 101, 102, 103) that eject ink droplets toward the sheet S on the conveyance belt 14, a downstream conveyance path 15 of the sheet S, and a control board 17 are disposed inside a housing 11. A discharge tray 16 is also provided. An operation unit 18, which is a user interface, is provided at an upper portion side of the housing 11.

Image data to be printed on the sheet S is generated by, for example, a computer 200 that is an externally connected device. The image data generated by the computer 200 is transmitted to the control board 17 of the inkjet printer 10 through a cable 201 and connectors 202 and 203.

A pickup roller 204 supplies the sheets S one by one from the cassette 12 to the upstream conveyance path 13. The upstream conveyance path 13 includes feed roller pairs 131 and 132, and sheet guide plates 133 and 134. The sheet S is conveyed to an upper surface of the conveyance belt 14 via the upstream conveyance path 13. An arrow 104 in the drawing indicates a conveyance path of the sheet S from the cassette 12 to the conveyance belt 14.

The conveyance belt 14 is a mesh-like endless belt having a large number of through holes formed on a surface thereof. Three rollers, that is, a drive roller 141 and driven rollers 142 and 143, rotatably support the conveyance belt 14. A motor 205 rotates the conveyance belt 14 by rotating the drive roller 141. In the drawing, an arrow 105 indicates a rotation direction of the conveyance belt 14. A negative pressure container 206 is disposed on a back surface side of the conveyance belt 14. The negative pressure container 206 is connected to a pressure reducing fan 207. The fan 207 produces an airflow to cause an inside of the negative pressure container 206 to have a negative pressure relative to atmospheric pressure and causes the sheet S to be held on the upper surface of the conveyance belt 14 by a suction force. In the drawing, an arrow 106 denotes a flow of the airflow.

The inkjet heads 100 to 103, each of which is an example of a liquid ejection head, are disposed so as to face the sheet S on the conveyance belt 14 with a slight gap of, for example, 1 mm therebetween. The inkjet heads 100 to 103 each eject ink droplets toward the sheet S. The inkjet heads 100 to 103 can thus print an image on the sheet S when the sheet S passes below. The inkjet heads 100 to 103 have the same structure with the difference being that respective inks to be ejected by each have different colors from one another. The colors of the inks are, for example, cyan, magenta, yellow, and black.

The inkjet heads 100 to 103 are connected to ink tanks (315, 316, 317, 318) and ink supply pressure adjusting devices (321, 322, 323, 324) via ink flow paths (311, 312, 313, 314). The ink tanks 315 to 318 are disposed above the inkjet heads 100 to 103, respectively. During standby, in order to prevent ink from leaking from nozzles 25 (see FIG. 2) of the inkjet heads 100 to 103, the ink supply pressure adjusting devices 321 to 324 respectively adjust pressure inside of the inkjet heads 100 to 103 to a negative pressure (with respect to atmospheric pressure), for example, −1.2 kPa. At the time of image formation processes, the ink in the respective ink tanks 315 to 318 are supplied to the respective inkjet heads 100 to 103 by the respective ink supply pressure adjusting devices 321 to 324.

After the image formation, the sheet S is fed from the conveyance belt 14 to the downstream conveyance path 15. The downstream conveyance path 15 includes feed roller pairs 151, 152, 153, and 154, and sheet guide plates 155 and 156 that define a conveyance path of the sheet S. The sheet S passes through the downstream conveyance path 15 and is fed from a discharge port 157 to the discharge tray 16. An arrow 107 in the drawing indicates a conveyance path of the sheet S.

Next, a configuration of the inkjet heads 100 to 103 will be described. The inkjet head 100 is described with reference to FIGS. 2 to 7, the inkjet heads 101 to 103 have the same structure as the inkjet head 100.

Figure 2:
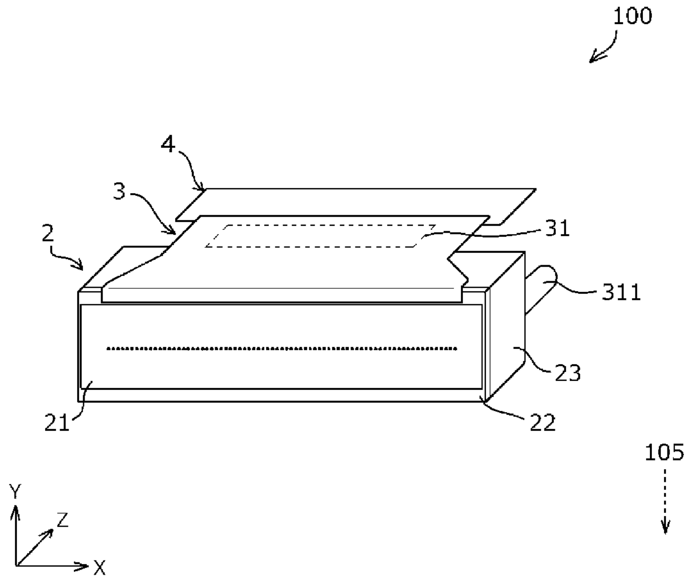
FIG. 2 is a perspective view of an inkjet head.

As illustrated in FIG. 2, the inkjet head 100 includes a head portion 2 that is an example of a liquid ejection portion. The head portion 2 includes a nozzle plate 21, an actuator substrate 22, and an ink supply portion 23. The ink supply portion 23 is connected to the ink supply pressure adjusting device 321 (see FIG. 1) via the ink flow path 311. The actuator substrate 22 of the head portion 2 is connected to a flexible printed wiring board 3 that is, for example, a film-based wiring board. The flexible printed wiring board 3 in this example is connected to a printed circuit board 4, which may serve as a relay board.

On the flexible printed wiring board 3 an integrated circuit (IC) 31 is mounted. IC 31 is used for driving of ink ejections and may be referred to as a driver chip 31 or a driving IC 31. In other examples, the driving IC 31 may be mounted on a substrate different from the flexible printed wiring board 3 and connected to the flexible printed wiring board 3 rather than directly mounted thereon. The driving IC 31 temporarily stores print data from the control board 17 of the inkjet printer 10 that has been sent via the printed circuit board 4. The driving IC 31 functions as a control unit and gives a drive signal to each channel so as to eject an ink at a predetermined timing in manner corresponding to the print (image) data or the like.

The nozzle plate 21, which is an example of a nozzle portion, is a rectangular plate formed of, for example, a resin such as polyimide or a metal such as stainless steel. The nozzles 25 of the channels are arranged along a longitudinal direction (X direction) of the nozzle plate 21. A nozzle density is set within a range of, for example, 150 dpi to 1200 dpi.

Figure 3:
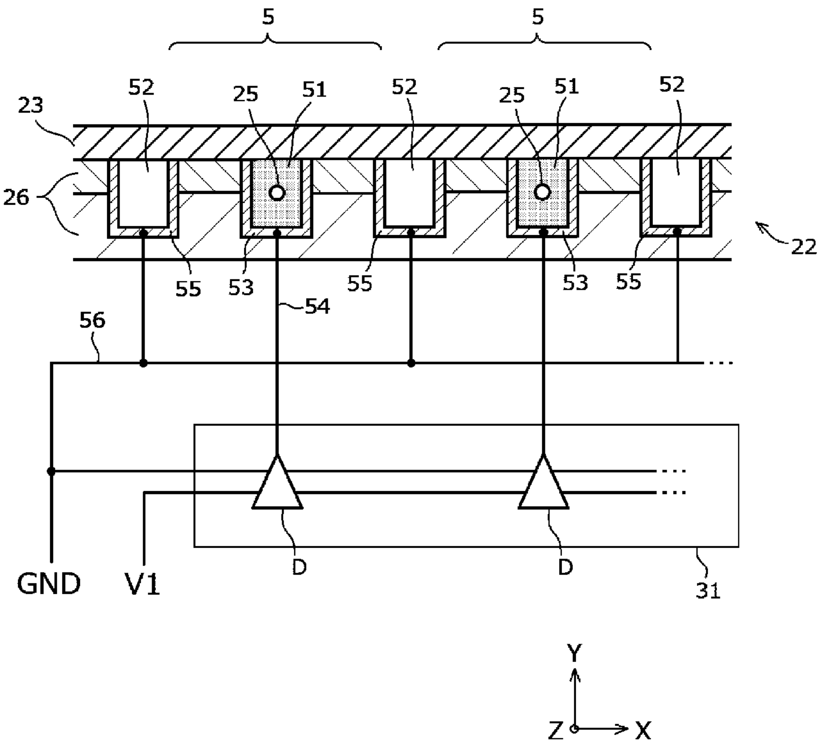
FIG. 3 is a cross-sectional view of an actuator.

The actuator substrate 22 is, for example, a rectangular substrate made of insulating ceramics. As illustrated in FIG. 3, pressure chambers 51 and air chambers 52 are alternately formed with one another in the actuator substrate 22 along a first direction, for example, the X direction. Each pressure chamber 51 communicates with a corresponding nozzle 25. Each pressure chamber 51 communicates with the ink supply portion 23 via a common ink chamber formed in the actuator substrate 22, for example. The air chambers 52 disposed adjacently to the pressure chambers 51 are, for example, closed spaces that do not communicate with a nozzle 25 or the common ink chamber. The pressure chambers 51 and the air chambers 52 are formed by cutting out portions of two piezoelectric members 26 stacked on the actuator substrate 22 with opposite polarization directions (for example, facing directions), in a rectangular groove shape extending lengthwise in a second direction such as a Z direction. That is, the pressure chamber 51 and the air chamber 52 are partitioned from each other by remaining portions of the two piezoelectric members 26. The two piezoelectric members 26 are stacked on each other in a third direction, for example, a Y direction. The remaining portions of the two piezoelectric members 26 left after the cutting out of the rectangular groove shapes which may be referred to as side walls in some instances.

An electrode 53 is formed on a bottom surface and both side surfaces of the groove-shaped pressure chamber 51. The electrode 53 of each pressure chamber 51 is connected to an individual wiring 54 (also referred to as a wiring electrode 54). The electrode 55 is formed on a bottom surface and both side surfaces of the groove-shaped air chamber 52. The electrode 55 of each air chamber 52 is connected to a common wiring 56 (also referred to as a wiring electrode 56). That is, a connection point between an electrode 53 of a pressure chamber 51 and individual wiring 54 is one terminal of one actuator 5. A connection point between the electrode 55 of the air chamber 52 and the common wiring 56 is the other terminal of the actuator 5. The individual wiring 54 is connected to a drive circuit D ("driver D") of the driving IC 31. The driver D for each channel applies a drive voltage V1 as a drive signal to the corresponding actuator 5 of the channel to independently drive the actuator 5. The common wiring 56 is connected to, for example, the ground (GND). With this configuration, an electric field is applied in a direction intersecting (desirably, orthogonal to) a polarization axis of the piezoelectric member 26 in the actuator 5, and the piezoelectric member 26 portion that is a side wall of the pressure chamber 51 is deformed symmetrically in the X direction in a shear mode.

That is, the pressure chamber 51 for ink is formed sandwiched between a pair of columnar actuators 5. A potential difference is applied to both walls of the columnar actuator 5, that is, an inner wall and an outer wall of the pressure chamber 51, and the actuator 5 is deformed by being charged. Accordingly, a volume of the pressure chamber 51 is changed, and as a result, an ink pressure in the pressure chamber 51 is changed. By adjusting a magnitude and a timing of this pressure/volume change, ink can be ejected from the nozzle 25.

Figure 4:
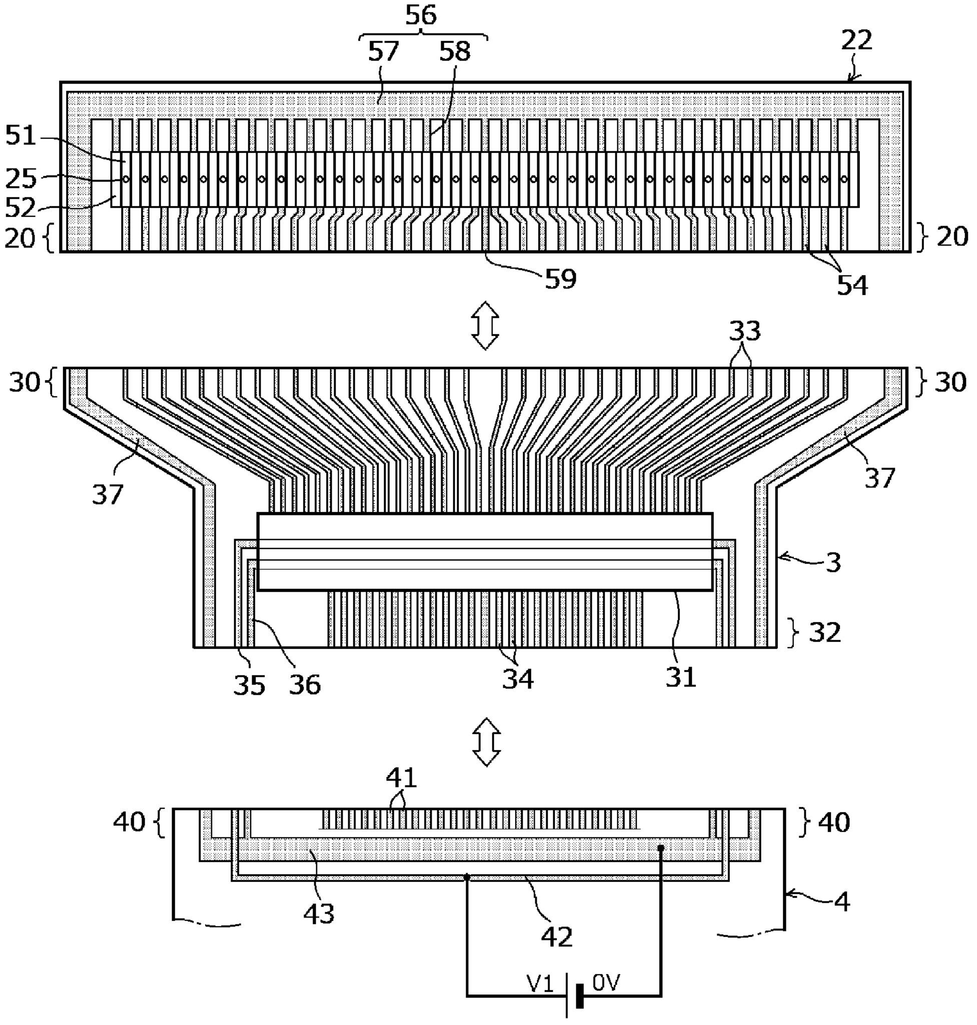
FIG. 4 is a plan view of an actuator substrate, a flexible printed wiring board, and a printed circuit board.
Figure 5:
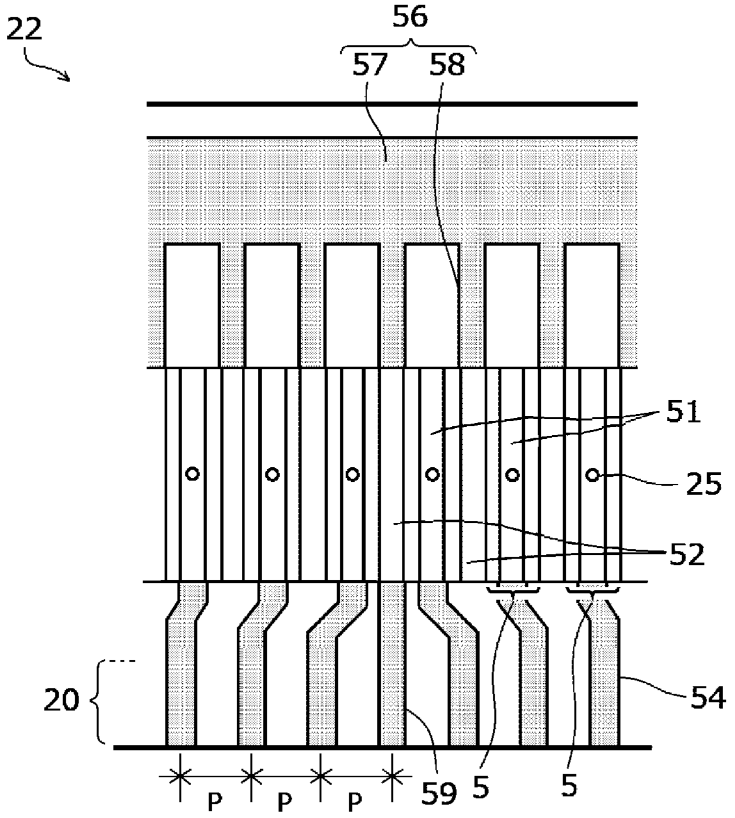
FIG. 5 is a partially enlarged view of an actuator substrate.
Figure 6:
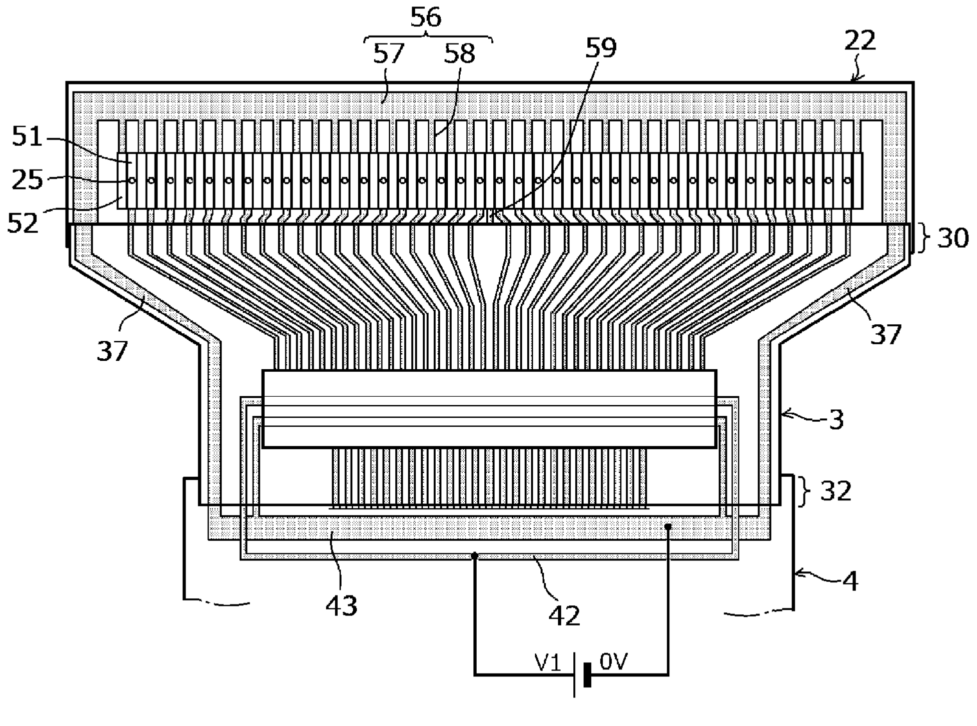
FIG. 6 is a plan view illustrating an actuator substrate, a flexible printed wiring board, and a printed circuit board that are connected to each other.
Figure 7:
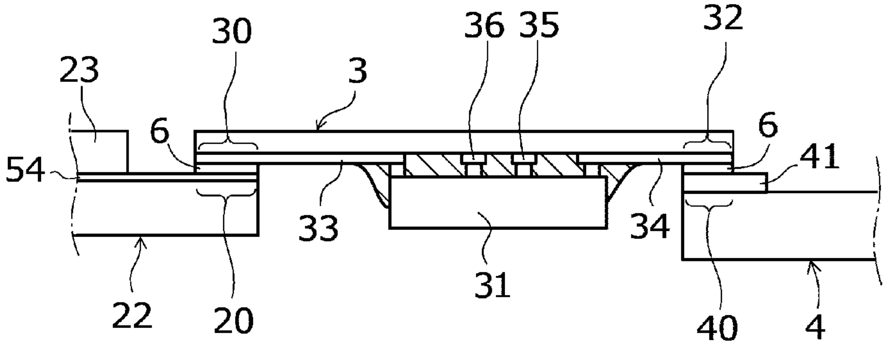
FIG. 7 is a side view illustrating an actuator substrate, a flexible printed wiring board, and a printed circuit board connected to each other.

FIG. 4 is a plan view of the actuator substrate 22, the flexible printed wiring board 3, and the printed circuit board 4 before being connected to each other. FIG. 5 is a partially enlarged view of the actuator substrate 22. FIG. 6 is a plan view illustrating the substrates 22, 3, and 4 connected to each other. FIG. 7 is a side view illustrating the substrates 22, 3, and 4 when connected to each other.

The actuator substrate 22 and the flexible printed wiring board 3 are connected such that respective terminal portions 20 and 30 overlap each other. The flexible printed wiring board 3 and the printed circuit board 4 are connected such that respective terminal portions 32 and 40 overlap each other.

As described above, an actuator 5 has an individual wiring 54 (wire) connected to one terminal thereof. A plurality of individual wirings 54 (wires) thus are led out from the respective actuators 5 and formed up (gathered together) at the terminal portion 20 at one edge of the actuator substrate 22. The one edge of the actuator substrate 22 is the edge of the substrate on a side to which the flexible printed wiring board 3 is connected. In the terminal portion 20, the individual wirings 54 are formed in parallel at equal intervals, for example.

The common wiring 56 in this example includes a first wiring portion 57 and several second wiring portions 58. The first wiring portion 57 and the second wiring portion 58 are disposed on a side opposite to the terminal portion 20 as viewed from the actuator 5 so as not to intersect with the individual wiring 54. The first wiring portion 57 is formed along an arrangement direction of the actuators 5 on the other edge side of the actuator substrate 22 and is formed up at the terminal portion 20 by folding back both sides, for example, both end portions in the arrangement direction of the actuators 5 in a direction intersecting the arrangement direction of the actuators 5. Therefore, in the terminal portion 20, a pair of terminals led out from both end portions of the first wiring portion 57 are positioned symmetrically at both sides of the substrate. The direction intersecting the arrangement direction of the actuators 5 is, for example, a direction orthogonal to the arrangement direction of the actuators 5. The plurality of second wiring portions 58 branched from the first wiring portion 57 are formed along the direction intersecting the arrangement direction of the actuators 5, and each second wiring portion 58 is connected to the other terminal of the corresponding actuator 5.

A monitor terminal 59 is disposed on the side to which the flexible printed wiring board 3 is connected. The monitor terminal 59 is connected to the first wiring portion 57 of the common wiring 56 and is used when measuring resistance of the first wiring portion 57. As an example, the monitor terminal 59 is formed in a wire shape and passes between a pair of otherwise adjacent individual wirings 54. The monitor terminal 59 is connected to the first wiring portion 57 at a position between adjacent actuators 5. In the illustrated example, a portion of the monitor terminal 59 is formed by an electrode 55 (see FIG. 3) of an air chamber 52 and another portion is formed by a second wiring portion 58. That is, the monitor terminal 59 is led out by using the electrode 55 of an air chamber 52 to be connected to the first wiring portion 57 across the arrangement of the actuators 5 without intersecting with other wirings such as the individual wirings 54 and the second wiring portion 58 of another channel. In a case of a head structure in which the air chambers 52 are not provided, the monitor terminal 59 may be an independent wiring connected to the first wiring portion 57.

The monitor terminal 59 is formed at a position corresponding to a midpoint or the like along a length direction of the first wiring portion 57 extending along the arrangement direction of the actuators 5. Preferably, the position is where the first wiring portion 57 is symmetrically divided into two different parts. The number of monitor terminals 59 is not necessarily limited to just one at the midpoint position, and a plurality of monitor terminals 59 may be provided using electrodes of a plurality of air chambers 52. By increasing the number of monitor terminals 59, electrode resistance can be managed or tracked more finely. Further, as a preferable example, an interval between individual wirings 54 adjacent to the monitor terminal 59 and the interval between adjacent individual wirings 54 is adjusted so that pitches P of the terminals in the terminal portion 20 are equal (see FIG. 5). With this arrangement, the monitor terminal 59 and an electrostatic capacitance measurement terminal, which will be described later, are arranged at equal intervals, and thus there is an advantage that batch probing can be facilitated.

The individual wirings 54, the first wiring portion 57, the second wiring portions 58, and the monitor terminal(s) 59 are formed of, for example, nickel, aluminum, gold, or an alloy thereof in a thin film shape. A wiring width of the individual wirings 54, the second wiring portions 58, and the monitor terminal(s) 59 can be selected from a range of, for example, 10 μm to 30 μm. Since the first wiring portion 57 needs to supply charging and discharging currents to all the actuators 5, a wiring width of the first wiring portion 57 is larger than that of the individual second wiring portions 58. The wiring width of the first wiring portion 57 is, for example, 0.8 mm. A thickness of the individual wirings 54, the first wiring portion 57, the second wiring portions 58, and the monitor terminal(s) 59 is, for example, 0.4 μm. In order to ensure electrical insulation (separation), an insulating layer, an insulating material, or the like may be provided in regions outside the terminal portion 20.

The flexible printed wiring board 3 is a flexible printed wiring board comprising, for example, a synthetic resin film of polyimide. The driving IC 31 is, for example, a driver chip formed on a silicon semiconductor substrate. Output wirings 33, input wirings 34, a power supply wiring 35 for the voltage V1, a ground wiring 36, and common passing wirings 37 are formed on the flexible printed wiring board 3. The wirings 33 to 37 and the driving IC 31 are preferably formed on one surface of the flexible printed wiring board 3. As an example, the flexible printed wiring board 3 is formed using a chip on film (COF) technique. The output wirings 33 led out from the driving IC 31 are formed up at the terminal portion 30. The output wirings 33 are individual wirings formed on the flexible printed wiring board 3. The number of output wirings 33 is, for example, the same as the number of the individual wirings 54 on the actuator substrate 22 side.

The common passing wiring 37 is formed from the terminal portion 30 on a side to which the actuator substrate 22 is connected, to the terminal portion 32 on a side to which the printed circuit board 4 is connected. The common passing wirings 37 are formed in pairs on both sides of the substrate to reduce a voltage drop occurring in the first wiring portion 57 during driving. The common passing wirings 37 are respectively connected to terminals of the first wiring portion 57 that are formed in a pair on the terminal portion 20 of the actuator substrate 22.

The input wirings 34 led out from the driving IC 31 are formed up at the terminal portion 32 on a side to which the printed circuit board 4 is connected. Since the driving IC 31 can be controlled by serial communication, the number of the input wirings 34 can be less than the number of the output wirings 33.

The power supply wiring 35 and the ground wiring 36 are connected to the driving IC 31. The power supply wiring 35 and the ground wiring 36 are formed up at the terminal portion 32 on the side to which the printed circuit board 4 is connected. The output wirings 33, the input wirings 34, the power supply wiring 35, the ground wiring 36, and the common passing wiring 37 are formed of, for example, copper thin film.

The printed circuit board 4 is a hard substrate (e.g., inflexible substrate). The printed circuit board 4 in this example permits through holes to be formed in the substrate material. The substrate material in this example comprises one or more epoxy resin layer containing glass fibers with one or more copper wiring layers laminated together in multiple layers. Output wirings 41, a power supply wiring 42, and a ground wiring 43 are formed in a terminal portion 40. The output wirings 41 are connected to the input wirings 34 of the flexible printed wiring board 3. The power supply wiring 42 is connected to the power supply wiring 35 of the flexible printed wiring board 3. The ground wiring 43 is connected to the ground wiring 36 and the common passing wiring 37 of the flexible printed wiring board 3. Signals for selectively driving the actuators 5, which are sent from the control board 17 of the inkjet printer 10, are supplied to the output wirings 41. The drive voltage V1 is applied to the power supply wiring 42. The ground wiring 43 is connected to the ground (GND) by, for example, the control board 17 of the inkjet printer 10.

In particular, as illustrated in FIG. 7, the terminal portion 20 of the actuator substrate 22 and the terminal portion 30 of the flexible printed wiring board 3 can be connected via an anisotropic conductive film (ACF) 6. That is, the terminal portion 20 of the actuator substrate 22 and the terminal portion 30 of the flexible printed wiring board 3 are arranged so as to face each other, the ACF 6 is interposed therebetween, and the wirings of the terminal portions 20 and 30 are collectively connected by thermocompression bonding using, for example, a thermocompression bonding tool. Accordingly, the individual wirings 54 and the output wirings 33, and the common wiring 56 and the common passing wiring 37 can be electrically connected to each other. The flexible printed wiring board 3 and the printed circuit board 4 are connected in the same manner.

Figure 8:
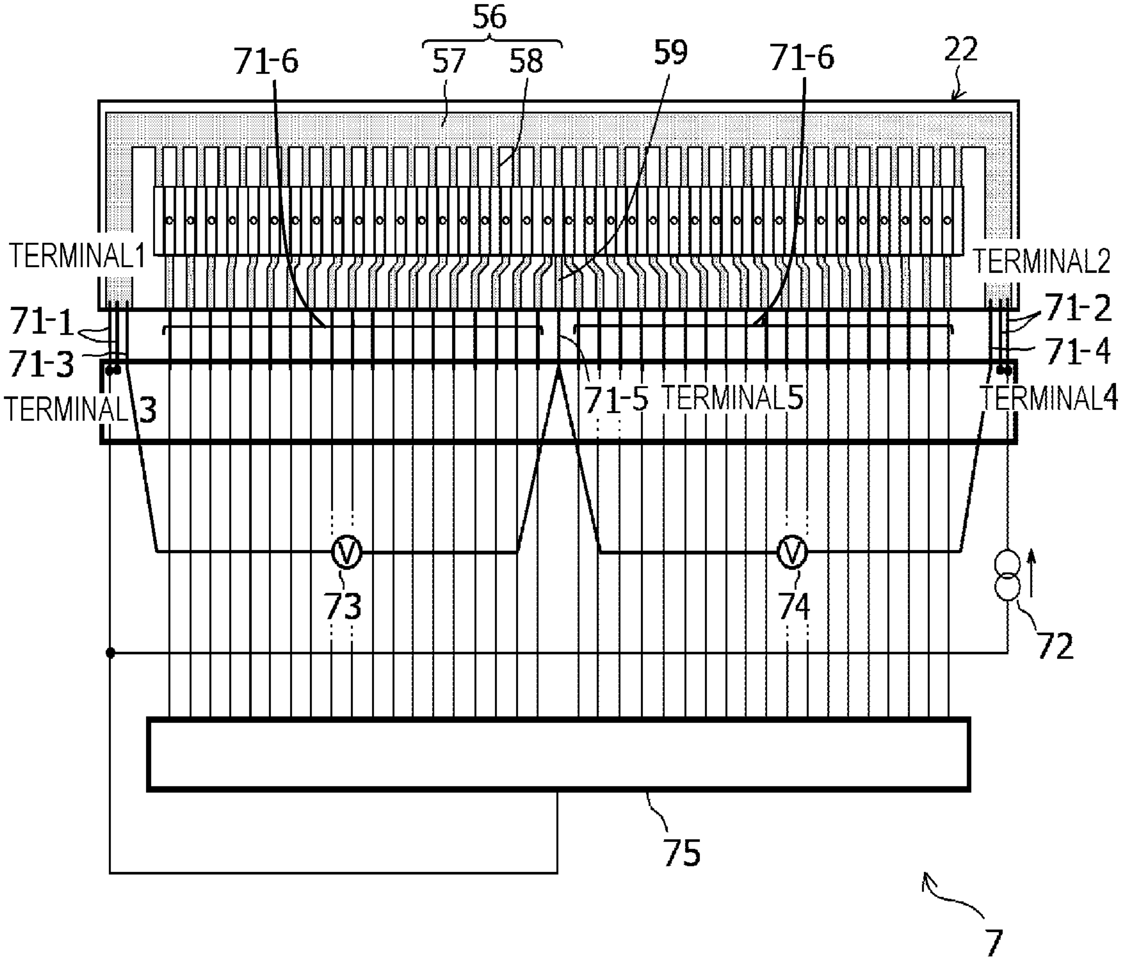
FIG. 8 is a diagram of a circuit that measures resistance of a common wiring.

FIG. 8 is a configuration diagram of a resistance measurement circuit 7 that measures the resistance of the first wiring portion 57 of the common wiring 56. The measurement of the resistance is performed on the actuator substrate 22 before the flexible printed wiring board 3 is connected, for example, during a manufacturing process of the inkjet head 100. As illustrated in FIG. 8, probes 71 are used to measure the resistance of the first wiring portion 57. A plurality of probes 71 can be used to measure resistance at the first wiring portion 57, and one or more of the monitor terminal 59 arranged in the terminal portion 20.

The resistance of the first wiring portion 57 can be measured using a four-terminal method. In the resistance measurement circuit 7, the probes 71 connected to a current source 72 are connected to different ends of the first wiring portion 57 as the "Terminal 1" and the "Terminal 2", respectively. A voltage detection circuit 73 is connected to "Terminal 1" of the first wiring portion 57 and the monitor terminal 59. A voltage detection circuit 74 is connected to "Terminal 2" of the first wiring portion 57 and the monitor terminal 59. In FIG. 8, two probes 71 connected to the current source 72 are used as a set to cause a predetermined current to flow.

In the measurement of the resistance of the first wiring portion 57, a predetermined current from the current source 72 is caused to flow from "Terminal 2" to the "Terminal 1" of the first wiring portion 57, and the current is measured. The "Terminal 1" and "Terminal 2" are led out from opposite ends of the first wiring portion 57 in order to prevent a voltage drop that can be caused by current concentration when many actuators 5 are simultaneously driven during printing, and this configuration is also used in the measurement of the resistance.

At the same time, a voltage (first detection voltage) between the "Terminal 3" and the "Terminal 5" is measured. "Terminal 3" connects to the first wiring portion 57 in close proximity to the "Terminal 1", and "Terminal 5" connects to the monitor terminal 59. Terminal 1 and Terminal 2" are current-supplying terminals of a four terminal method. "Terminal 3 and "Terminal 5" are voltage detection terminals. At the same time, a voltage (second detection voltage) between the "Terminal 5" and the "Terminal 4" of the first wiring portion 57 is measured. The "Terminal 4" is connected to the wiring 57 in proximity to the Terminal 2. "Terminal 2" and "Terminal 1" are current-supply terminals of the four terminal method. "Terminal 4" and "Terminal 5" are voltage detection terminals. In accordance with Ohm's law, a value obtained by dividing the detection first detection voltage by the current flow value is equal to the resistance value of a half of the first wiring portion 57 (on the left side of the drawing), a value obtained by dividing the second detection voltage by the current flow value is the resistance value of a half of the first wiring portion 57 (on the right side of the drawing), and a value obtained by dividing a sum of the first detection voltage and the second detection voltage by the current flow value is the resistance value of the entire first wiring portion 57. If the number of available monitor terminals 59 is increased, the distribution of the wiring resistances along the first wiring portion 57 can be determined in more detail. It is preferable to manage the wiring forming processes in the manufacturing process so that these resistance values for different portions of the first wiring portion 57 fall within some predetermined range of values.

As described with reference to FIG. 3, one terminal of each actuator 5 is connected to the individual wiring 54, and each actuator 5 is independently driven by the corresponding driver D of the driving IC 31. The other terminal of each actuator 5 is connected to a common potential via the common wiring 56 (57, 58). When the common potential is constant for each actuator 5, a net voltage applied to each actuator 5 can be individually controlled for each channel according to an output waveform of each driver D connected to the individual wiring 54 without adjustment/compensation.

However, in reality, since the common wiring 56 (or sub-portions 57 thereof) unavoidably has resistance, the current flow through the common wiring 56 varies when driving different actuators 5. In particular, the resistance of the first wiring portion 57 causes a voltage drop when charging and discharging currents from the actuators 5 are concentrated. Since the voltage drop changes depending on which channel is being driven, a phenomenon called cross-talk in which ejection characteristics of each channel change depending on a printing pattern may occur in the inkjet head 100, and the printing quality deteriorates. In order to prevent this, it is generally necessary to keep the resistance of the first wiring portion 57 to a low value. For the management of this phenomenon, it is generally necessary to measure certain resistance values in the inkjet head 100.

In addition, the resistance of the first wiring portion 57 may not be formed uniformly due to manufacturing issues along its length or at each position. For example, when the common wiring 56 (57, 58) is formed by wet chemical plating, depending on a state of a plating layer, there may be a place where the plating is thicker and the resistance is lower and a place where the plating is thinner and the resistance is higher. Therefore, it is desirable to understand or measure the actual distribution of the resistances within or along the first wiring portion 57.

The monitor terminal 59 is prepared to be connectable. By measuring a voltage waveform at the monitor terminal 59 during driving, it is possible to confirm how much the voltage drop is caused by the resistance of the first wiring portion 57, which affects a net waveform applied to an actuator 5.

Figure 9:
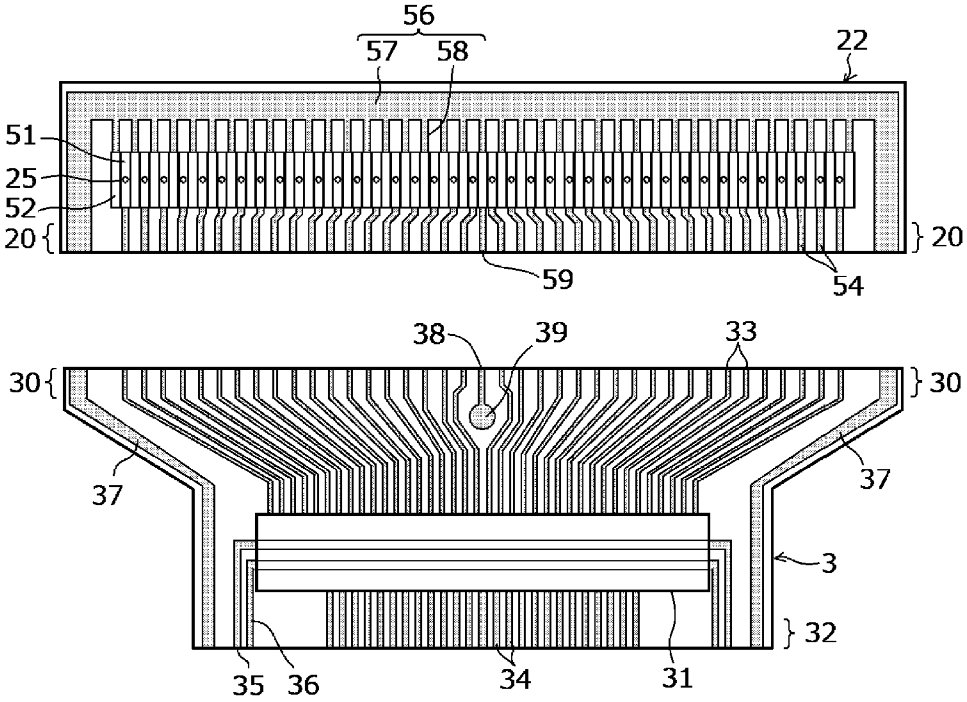
FIG. 9 is a plan view illustrating another example of an actuator substrate and a flexible printed wiring board.

Further, as illustrated in FIG. 9, a monitor terminal 38 and a monitor pad 39 may be provided on the flexible printed wiring board 3, and the monitor terminal 59 of the actuator substrate 22 and the monitor terminal 38 may be connected by the ACF 6. This is because if the monitor pad 39 is provided on the flexible printed wiring board 3, probing for confirming the net waveform is easier. In order to prevent a short circuit in a normal state, the monitor pad 39 may be normally covered with a resist material (insulating material) formed on the flexible printed wiring board 3. In this case, when confirming the net waveform, the resist material may be peeled off to achieve contact with the monitor pad 39. In addition, it is possible to track aspects related to the process of manufacturing the inkjet head 100.

The measurement circuit depicted in FIG. 8 can also measures or detect whether each actuator 5 is normal. For example, a capacitance measurement circuit 75 can be used to measure a capacitance of each actuator 5 by measuring a waveform of a current flowing through each probe 71 when a predetermined voltage waveform is being applied via the probe 71-6. The probe 71-6 connects each the individual wirings 54 individually to the capacitance measurement circuit 75. Then, based on the measured capacitances, it can be determined whether each actuator 5 is normal and/or whether a wiring pattern for each individual wiring 54 is normal. If the probe 71-6 and the probes 71-1 to 71-5 are integrally configured so that probing can be performed collectively, both the resistance measurement of the first wiring portion 57 and the capacitance measurement of the actuators 5 can be performed by switching tested circuits during probing or changing positioning of probes 71, and inspection time can be shortened. In this case, the monitor terminal 59 of the first wiring portion 57 is used in measuring the resistance of the first wiring portion 57, and the capacitance of an actuator 5 can be measured between each individual wiring 54 and at least one of "Terminal 1" or "Terminal 2" of the first wiring portion 57 or the monitor terminal 59. When the resistance measurement of the first wiring portion 57 and the capacitance measurements of the actuators 5 are performed at the same time, the measurement time can be further shortened. But when the resistance measurement and the capacitance measurement are separately performed by switching circuits, a measurement results are typically more accurate.

According to the above-described embodiment, by providing the monitor terminal 59 on the actuator substrate 22, it is possible to measure the resistance of the first wiring portion 57 that applies a common potential to the plurality of actuators 5.

Figure 10:
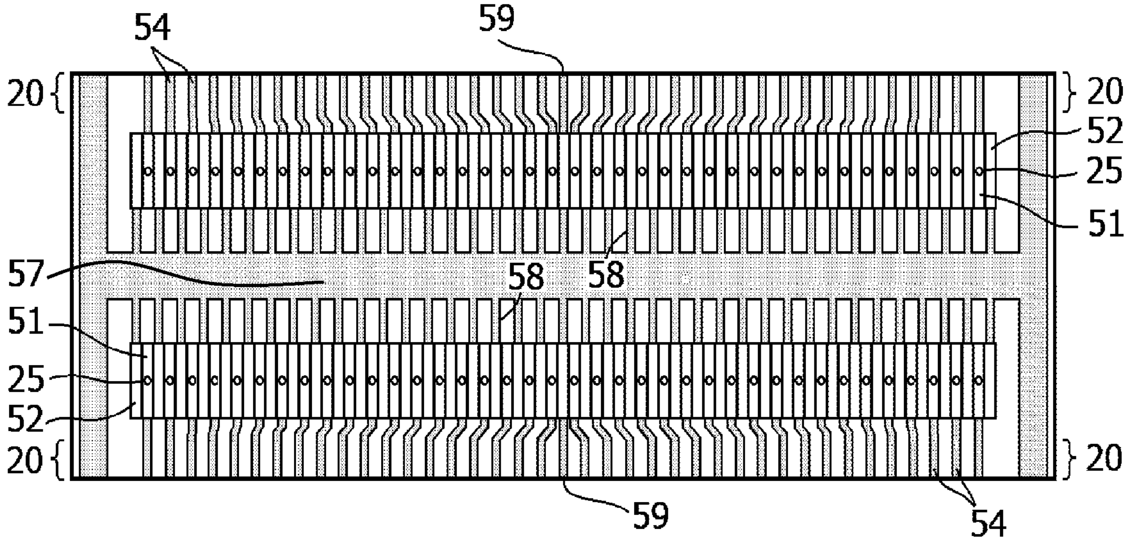
FIG. 10 depicts an inkjet head of an embodiment with two rows of actuators.

The inkjet head 100 is not limited to a inkjet head with a single row of actuators. For example, as shown in FIG. 10, the inkjet head 100 may have two rows of actuators. In the case of the inkjet head 100 including two rows of actuators, the first wiring portion 57 is between the two rows of actuators.

The inkjet head 100 is not limited to the shear-mode actuator 5 in which the pressure chamber 51 and the air chamber 52 are alternately arranged. For example, a plurality of nozzles 25 and a plurality of actuators 5 may be arranged on a surface of the nozzle plate 21. In addition, an actuator 5 of a drop-on-demand piezo type may be used.

In an embodiment, the inkjet head 100 of the inkjet printer 10 is described as an example of a liquid ejection device, in other examples the liquid ejection device of the present disclosure may be a molding material ejection head of a 3D printer or a sample ejection head of a dispensing device.

While certain embodiments have been described, these embodiments have been presented by way of example only, and are not intended to limit the scope of the disclosure. The novel embodiments can be implemented in various other forms, and various omissions, substitutions, and modifications may be made without departing from the scope of the disclosure. The embodiments and modifications are included in the scope and the gist of the disclosure, and included in the disclosure described in the claims and the scope of equivalents of the disclosure.

What is claimed is:

1. A liquid ejection head, comprising:

a plurality of actuators on a substrate spaced from one another along a first direction, the plurality of actuators being between a first edge side of the substrate and a second edge side of the substrate in a second direction;

a plurality of individual wirings on the substrate, each individual wiring being connected to a first terminal of an actuator in the plurality of actuators and having a terminal portion at the first edge side of the substrate;

a common wiring on the substrate and including a first portion and a plurality of second portions, each second portion being branched from the first portion in the second direction and individually connected to a second terminal of an actuator in the plurality of actuators, the first portion extending along the first direction on the second edge side of the substrate and having a first end terminal and a second end terminal spaced from each other in the first direction on the substrate; and a monitor terminal on the substrate at a position between the first and second end terminals of the first portion in the first direction, the monitor terminal extending in the second direction from the first edge side of the substrate toward the first portion, the monitor terminal being electrically connected to the first portion on the substrate.

2. The liquid ejection head according to claim 1, wherein the monitor terminal is electrically connected to the first portion via a branch portion of the common wiring that extends in the second direction between a pair of second portions.

3. The liquid ejection head according to claim 1, wherein the monitor terminal passes between a pair of the individual wirings otherwise adjacent to each other in the first direction.

4. The liquid ejection head according to claim 1, wherein the monitor terminal is electrically connected to the first portion at a midpoint of the first portion in along the first direction.

5. The liquid ejection head according to claim 1, wherein the monitor terminal is electrically connected to the first portion at a midpoint between the first and second end terminals.

6. The liquid ejection head according to claim 1, wherein each actuator comprises a pressure chamber between a pair of air chambers separated from the pressure chamber by piezoelectric material.

7. The liquid ejection head according to claim 6, wherein the monitor terminal is electrically connected to the first portion by an electrode disposed in one of the air chambers.

8. The liquid ejection head according to claim 1, wherein the monitor terminal extends to the first edge side of the substrate.

9. The liquid ejection head according to claim 1, further comprising:

a flexible printed wiring board including a plurality of terminal connections positioned corresponding to terminal portions of the plurality of individual wirings on the first edge side of the substrate.

10. The liquid ejection head according to claim 9, wherein the flexible printed wiring board further includes a test terminal positioned corresponding to the monitor terminal on the first edge side of the substrate.

11. A liquid ejection apparatus, comprising:

a liquid supply tank;

a liquid ejection head fluidly connected to the liquid supply tank and configured to eject liquid supplied from the liquid supply tank, the liquid ejection head including:

a plurality of actuators on a substrate spaced from one another along a first direction, the plurality of actuators being between a first edge side of the substrate and a second edge side of the substrate in a second direction;

a plurality of individual wirings on the substrate, each individual wiring being connected to a first terminal of an actuator in the plurality of actuators and having a terminal portion at the first edge side of the substrate;

a common wiring on the substrate and including a first portion and a plurality of second portions, each second portion being branched from the first portion in the second direction and individually connected to a second terminal of an actuator in the plurality of actuators, the first portion extending along the first direction on the second edge side of the substrate and having a first end terminal and a second end terminal spaced from each other in the first direction on the substrate; and a monitor terminal on the substrate at a position between the first and second end terminals of the first portion in the first direction, the monitor terminal extending in the second direction from the first edge side of the substrate toward the first portion, the monitor terminal being electrically connected to the first portion on the substrate.

12. The liquid ejection apparatus according to claim 11, wherein the monitor terminal is electrically connected to the first portion via a branch portion of the common wiring that extends in the second direction between a pair of second portions.

13. The liquid ejection apparatus according to claim 11, wherein the monitor terminal passes between a pair of the individual wirings otherwise adjacent to each other in the first direction.

14. The liquid ejection apparatus according to claim 11, wherein the monitor terminal is electrically connected to the first portion at a midpoint of the first portion in along the first direction.

15. The liquid ejection apparatus according to claim 11, wherein the monitor terminal is electrically connected to the first portion at a midpoint between the first and second end terminals.

16. The liquid ejection apparatus according to claim 11, wherein each actuator comprises a pressure chamber between a pair of air chambers separated from the pressure chamber by piezoelectric material.

17. The liquid ejection apparatus according to claim 16, wherein the monitor terminal is electrically connected to the first portion by an electrode disposed in one of the air chambers.

18. The liquid ejection apparatus according to claim 11, wherein the monitor terminal extends to the first edge side of the substrate.

19. A method of measuring resistance in a liquid ejection head, the method comprising:

placing a first probe on a monitor terminal of a liquid ejection head; and placing second and third probes on first and second end terminals of a first portion of a common wiring, wherein the liquid ejection head includes:

a plurality of actuators on a substrate spaced from one another along a first direction, the plurality of actuators being between a first edge side of the substrate and a second edge side of the substrate in a second direction, and a plurality of individual wirings on the substrate, each individual wiring being connected to a first terminal of an actuator in the plurality of actuators and having a terminal portion at the first edge side of the substrate, the common wiring is on the substrate and includes the first portion and a plurality of second portions, each second portion being branched from the first portion in the second direction and individually connected to a second terminal of an actuator in the plurality of actuators, the first portion extending along the first direction on the second edge side of the substrate, the first end terminal and the second end terminal of the first portion are spaced from each other in the first direction on the substrate, and the monitor terminal is at a position between the first and second end terminals of the first portion in the first direction, the monitor terminal extends in the second direction from the first edge side of the substrate toward the first portion, and the monitor terminal being electrically connected to the first portion on the substrate.

* * * * *